United States Patent [19]

Minkus et al.

[11] Patent Number: 4,545,838
[45] Date of Patent: Oct. 8, 1985

[54] LAMINATION PRODUCT AND METHOD EMPLOYING TEMPORARY TRANSFER FILM

[75] Inventors: Morton Minkus; Herbert M. Drower, both of Wilmette, Ill.

[73] Assignee: Sealtran Corp., Chicago, Ill.

[21] Appl. No.: 464,680

[22] Filed: Feb. 7, 1983

[51] Int. Cl.$^4$ ............................................. B32B 31/00
[52] U.S. Cl. ................................. 156/220; 156/230; 156/244.24; 156/246; 156/289; 283/109; 283/904
[58] Field of Search ............... 283/7, 107, 108, 109, 283/110, 111, 112, 904; 428/13, 347, 343, 352, 483; 156/220, 230, 244.12, 244.24, 246, 289

[56] References Cited

U.S. PATENT DOCUMENTS

| | | | |
|---|---|---|---|
| 3,847,979 | 4/1975 | Hannon | 428/13 |
| 4,047,996 | 9/1977 | Kanzelberger | 156/220 |
| 4,077,824 | 3/1978 | Paulson et al. | 156/244.24 |
| 4,151,666 | 5/1979 | Raphael et al. | 283/108 X |
| 4,475,971 | 10/1984 | Canterino | 156/244.24 X |

*Primary Examiner*—Paul A. Bell
*Attorney, Agent, or Firm*—Kinzer, Plyer, Dorn & McEachran

[57] ABSTRACT

A laminating film product for applying a sealed protective cover to a document such as an identification card has a cover film of an unoriented polyester resin extruded onto a surface of a transfer film of an oriented thermoset polyester resin that has been coated with a release agent such as a soap; a film of a thermoplastic adhesive resin may be extruded onto the exposed surface of the cover film. In use, the laminating film product is laminated to a document under heat and pressure, the transfer film is stripped away, and the exposed cover film is embossed. Magnetic strips, pigment strips, and the like may also be applied to the cover film by hot stamp transfer.

11 Claims, 5 Drawing Figures

LAMINATION PRODUCT AND METHOD EMPLOYING TEMPORARY TRANSFER FILM

BACKGROUND OF THE INVENTION

It is common practice to protect identification cards and other documents, including driver's licenses, student identification cards, security system identification documents, and the like, by sealing such documents into covers of thin, tough, transparent plastic film. One of the best known protective films for this purpose is a laminate that includes an outer film of hard, tough, abrasion resistant biaxially oriented thermoset polyester resin coated with an inner layer of a thermoplastic adhesive resin activatable by heat and pressure. The resin for the outer film is usually polyethylene terephthalate; the most frequently used adhesive resin is polyethylene. To complete a protective cover on an identification card or like document, the document is usually placed between two sheets of the laminating film and then passed through a laminating press in which heat and pressure are applied to activate the thermoplastic adhesive, bonding the film to the surfaces of the document; around the edges, the two sheets of laminating film may bond directly to each other.

A laminated assembly of this kind provides excellent protection for the identification document. The outer film of thermoset polyester withstands a great deal of abuse. It remains very hard, tough, and abrasion-resistant with little change due to aging; the transparency of the film is also little changed with age. The protective cover also makes it quite difficult to alter the identification card.

Identification documents protected by laminated covers of thermoset polyester film have not been suitable for a number of applications. Thus, the thermoset polyester film on the outer surface of a document assembly of this kind cannot be effectively embossed after lamination; indeed, it is extremely difficult to emboss at any time because the heat, pressure, and time requirements for effective embossure are excessive. Furthermore, it is difficult to obtain effective adherence between any supplementary external film and the surface of the hard polyester film. For example, in those applications in which it is desirable to provide a magnetizable strip on the protected document for the recording of an identification number or other security information, it becomes necessary to locate the magnetizable strip in the interior of the laminated document assembly. An inside location for a magnetizable strip is not desirable because the protective laminate increases the spacing between the strip and any recording or reading transducer. Moreover, with a protected document assembly of this construction, the document cannot be signed or otherwise validated by the user after lamination because the thermoset polyester film on the outer surface does not accept ordinary inks; the ink wipes off.

A laminating film that retains the basic advantages of the conventional sealed thermoset polyester cover and that also allows for surface embossure, for signature reception on the exterior of the sealed document cover, and for mounting of an external magnetic strip on the cover is described in the copending United States patent application of H. M. Drower and M. Minkus, Ser. No. 385,460 filed June 7, 1982 issued as U.S. Pat. No. 4,456,639 on June 26, 1984. That laminating film incorporates an external layer of an unoriented embossable thermoplastic polyester resin, extrusion coated onto the oriented thermoset polyester resin film. Covers made with this laminate have the proven protection characteristics of conventional sealed covers with the added features of embossability and acceptability of externally mounted magnetic strips and signature strips.

In the utilization of the Drower et al three layer laminate (thermoplastic polyester, thermoset polyester, and adhesive resin) precise control of laminating parameters, particularly the laminating temperature, must be maintained. Excessive temperatures may soften the exterior layer of thermoplastic polyester resin, and fouling of the laminating press may result. Thus, that laminate is not readily adaptable to processing with some commercial laminating presses, particularly the small, inexpensive presses frequently used for individual identification documents. Moreover, the thermoset polyester resin film used as the central layer in that laminate is unnecessary in some applications, particularly when maximum durability are not critically important; in such applications, a sealed cover of thermoplastic polyester resin would afford adequate protection with potentially appreciable cost reduction, particularly if the heat-activatable adhesive resin is also eliminated.

SUMMARY OF THE INVENTION

It is a primary object of the present invention, therefore, to provide a new and improved laminating product and lamination method for sealed covers for identification cards and like documents that provides a cover film of moderately hard, tough, abrasion-resistant thermoplastic polyester film that allows for surface embossure, for mounting of external magnetizable strips, and for effective retention of post-lamination signatures without requiring precision control of lamination parameters, particularly the lamination temperature.

A further object of the invention is to provide a new and improved laminating product and lamination method for applying a sealed cover to an identification card or like document, utilizing a cover film of moderately hard, tough, abrasion-resistant thermoplastic polyester resin, that permits lamination to be carried out with virtually all forms of conventional equipment, and that does not require an adhesive resin apart from the polyester itself.

A specific object of the invention is to provide an improved, inexpensive transparent laminating product and laminating method, with the film laminating product usable in pouch form or in sheet form, which produces a sealed document cover that permits external embossure and that accommodates external magnetizable data strips and external strips for signatures or other forms of validation.

Accordingly, in one aspect the invention relates to a laminating film product for use in producing a transparent sealed protective cover on an identification card or other document, comprising a cover film of moderately hard and tough unoriented thermoplastic polyester resin bonded in surface-to-surface relation to a transfer film of a thermoset resin that is stable at temperatures substantially higher than the softening temperature of the thermoplastic resin of the cover film, and a release agent coating between the cover film and the transfer film to permit the transfer film to be peeled away from the cover film for embossure or other subsequent processing.

In another aspect, the invention relates to the method of manufacturing a laminating film product adapted for use in producing a transparent sealed protective cover on an identification card or other document comprising the following steps:

A. applying a thin coating of a release agent to one surface of a transfer film of a very hard, tough thermoset resin; and B. extruding a layer of a moderately hard and tough embossable thermoplastic resin onto the coated surface of the transfer film, over the release coating, to form a cover film releasably bonded in surface-to-surface relation to the transfer film.

In a further aspect, the invention relates to the method of forming a transparent sealed protective cover on an identification card or other document comprising the following steps:

A. applying a thin coating of a release agent to one surface of a transfer fim of a very hard, tough thermoset resin;

B. extruding a layer of a moderately hard and tough embossable thermoplastic polyester resin onto the coated surface of the transfer film, over the release coating, to form a laminating film product having a cover film of the thermoplastic polyester resin releasably bonded in surface-to-surface relation to the transfer film;

C. aligning the laminating product with a document, with the cover film facing the document;

D. applying heat and pressure to the aligned laminating product and document, in a laminating press, to bond the laminating product to the document; and E. peeling the transfer film away from the laminating product to expose the cover film.

In a modification of this method there is an additional step added after step B, extruding a film of a soft thermoplastic adhesive resin, activatable by heat and pressure, onto the exposed surface of the cover film. With this modification, it is the adhesive resin that bonds the cover to the document.

DESCRIPTION OF THE PREFERRED EMBODIMENTS

Figure 1:
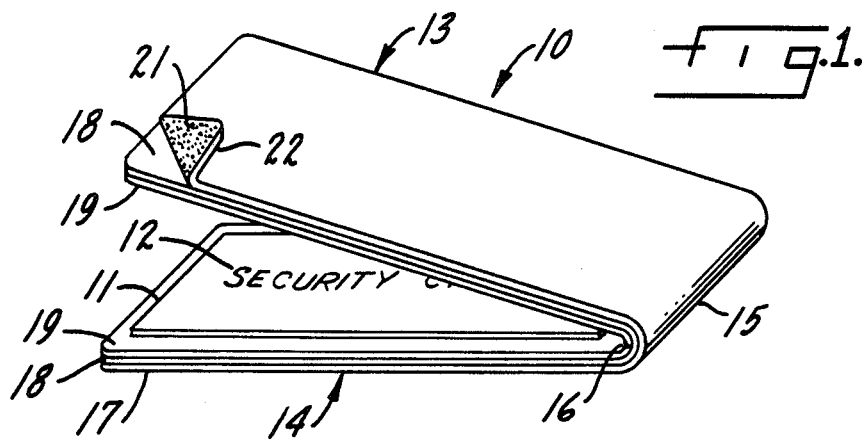
FIG. 1 is a perspective view of a laminating pouch, formed in accordance with one embodiment of the invention, for use in applying a sealed protective cover to an identification card or other document.

FIG. 1 illustrates a laminating pouch 10 formed of a transparent protective laminating film product made in accordance with the present invention. Pouch 10 is utilized to provide a sealed transparent protective cover for an identification card or other document 11. Document 11 may comprise a driver's license, a student identification card, a security identification card, a credit card, or a wide variety of other documents. Document 11 may bear appropriate identification data or other indicia 12 in printed, handwritten, typed, or other form. Document 11 may also include a photograph (not shown) imprinted on the base material of the document itself or inset as a separate element in the document.

Laminating pouch 10 comprises a first cover member 13 and a second cover member 14 joined to each other along a fold line 15. In pouch 10, members 13 and 14 are formed from a single sheet of a laminating film product of three-layer construction, as described below; that sheet may be scored as indicated at 16 in FIG. 1 to provide for accurate folding of the pouch along line 15, thereby maintaining the two cover members 13 and 14 accurately aligned with each other and accurately alignable with the edges of document 11.

The laminating film product from which pouch 10 is produced comprises three layers 17, 18 and 19, as shown in FIG. 1, in which the thickness of each layer is greatly exaggerated. The outermost film 17 is a thin film of a hard, tough, abrasion-resistant thermoset polyester resin. The preferred material for film 17, which is used as a transfer film as described below, is biaxially oriented polyethylene terephthalate, the biaxial orientation of the film being achieved by stretching. Film 17 preferably has a thickness of about one to two mils; a thicker film can be used if preferred but is of no benefit.

In the manufacture of the laminating film product from which pouch 10 is formed, the thermoset polyester transfer film 17 first has a very thin coating of a release agent applied to one surface, as generally indicated by the stippling 21 on the turned-back corner 22 of cover element 13 (FIG. 1). One of the most common suitable release agents is soap. Appropriate soaps, for this purpose, include the sodium salts of long chain organic acids such as sodium stearate and sodium octoate.

The middle layer 18 in the three-film laminating product comprising pouch 10, referred to herein as a "cover film", comprises a moderately hard and tough unoriented thermoplastic polyester resin. The cover film 18 is releasably bonded in surface-to-surface relation to the transfer film 17, due to the release coating 21 between the two films. Cover film 18 is formed in situ on the surface of transfer film 17 that is coated with the release agent. Preferably, cover film 18 constitutes an unoriented polyester resin, either a copolyester or an amorphous homopolymer. Cover film 18 typically has a thickness of at least two mils to about ten mils. The unoriented thermoplastic polyester cover film 18 can be applied to the biaxially oriented thermoset polyester transfer film 17 by essentially the same extrusion techniques as used in the conventional manufacture of polyethylene coated polyester film. In general, because cover film 18 is a thermoplastic material, the ranges of temperatures, pressures, and speeds used in normal extrusion coating onto a thermoset polyester film base can be used effectively. It should be noted that the thermoset polyester transfer film 17 is quite stable at temperatures well above the softening temperature of the thermoplastic polyester cover film 18.

The third layer 19 in the composite laminating product used for pouch 10 is formed of a soft thermoplastic adhesive resin that is activatable by heat and pressure to bond the pouch to document 11. Typically, layer 19 is formed of a polyethylene resin with a thickness of approximately three mils; again, a thicker adhesive resin layer can be used if preferred. In some embodiments, the adhesive resin film 19 can be eliminated entirely as discussed below in connection with FIG. 5. The adhesive resin film 19 can be applied to the surface of cover film 18 by conventional extrusion techniques.

Figure 2:
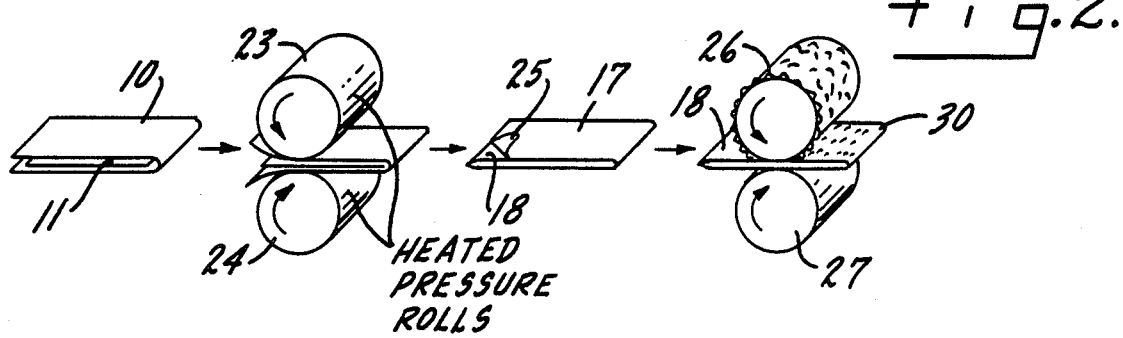
FIG. 2 is a schematic illustration of lamination and embossure stages in the method of the invention.
Figure 3:
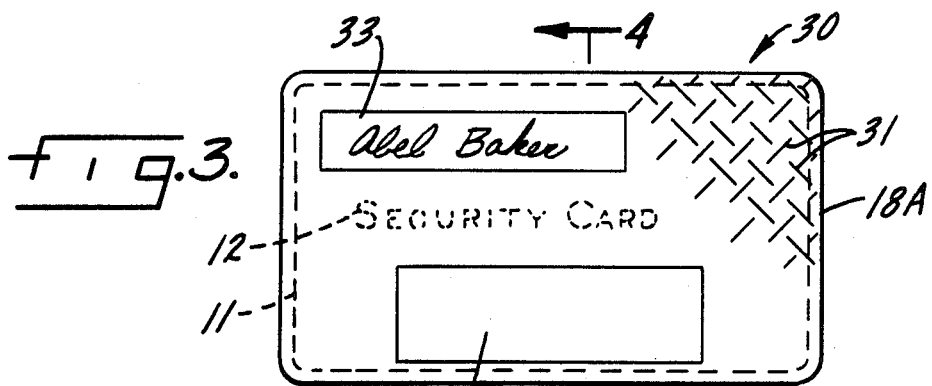
FIG. 3 is a plan view of an identification card produced as shown in FIG. 2 using the pouch of FIG. 1.
Figure 4:
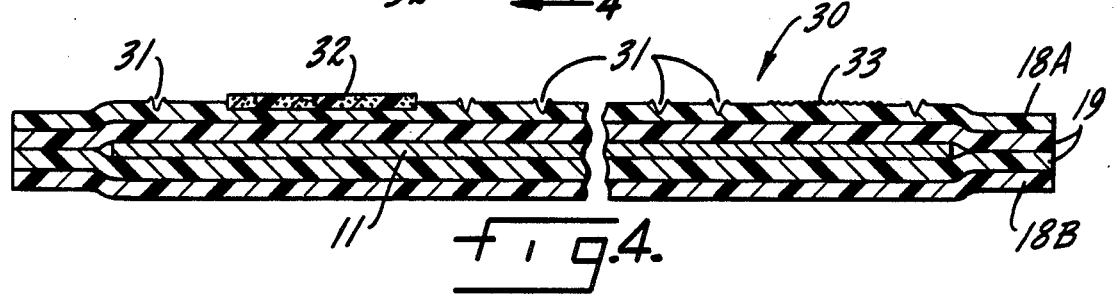
FIG. 4 is a detail sectional view taken approximately as indicated by line 4—4 in FIG. 3, with the thicknesses of individual layers greatly exaggerated.

FIG. 2 illustrates a preferred method of processing pouch 10 and document 11 (FIG. 1) to form a transparent sealed protective cover on document 11, the finished product being shown in FIGS. 3 and 4. Referring to FIG. 2, in the first stage of the process there illustrated the identification card or other document 11 is aligned within pouch 10 in the manner of FIG. 1. This aligned combination 10, 11 is then passed through a conventional heat-and-pressure laminating press, generally illustrated by the heated pressure rolls 23 and 24. As the assembly passes between rolls 23 and 24, it is heated to a temperature sufficient to soften the adhesive resin film 19 (FIG. 1). In a conventional laminating press, this operating temperature is usually in the range of about 250° to 300° F. At this temperature, with appreciable pressure applied by rolls 23 and 24, the two cover members 13 and 14 of the pouch are effectively sealed to document 11 and, around the edges, to each other.

After lamination in the press represented by rolls 23 and 24, FIG. 2, one corner 25 of transfer film 17 is pulled away from the underlying cover film 18 and transfer film 17 is then completely stripped away. Subsequently, one or both surfaces of the exposed cover film 18 can be embossed with a security pattern, as generally illustrated by an embossing station comprising a heated embossing roll 26 and mating roll 27.

An oriented thermoset polyester film such as transfer film 17 is extremely difficult to emboss; the temperatures, pressures, and embossing times required are generally prohibitive to the extent that embossure of a film of this kind, which constitutes the outer film for many conventional identification card covers, is not a practical possibility. However, this is not true of the unoriented thermoplastic polyester resin of cover layer 18, which is exposed when transfer film 17 is peeled away as discussed above in connection with FIG. 2. Consequently, it is readily possible to emboss the outer surface of the cover film on the laminated card assembly 30 with a repetitive security pattern 31 as shown in FIGS. 3 and 4. In FIGS. 3 and 4, the security pattern 31 is illustrated as a series of interrupted lines embossed into the one cover film 18A. However, it is readily possible to emboss the security pattern as a series of numbers, alphabetic characters, or any other desired design elements. Moreover, the other exposed cover film 18B can be similarly embossed.

The completed identification card 30 shown in FIGS. 3 and 4 further includes a magnetic data strip 32 and a signature strip 33 on the outer surface of cover film 18A; either of the strips 32 and 33 could be located on the outer surface of the other cover film 18B (FIG. 4) if desired. Strip 32 comprises a conventional film formed of a magnetic oxide and a resin binder and is readily applied to the outer surface of cover film 18A by the hot stamp transfer process utilized to apply similar magnetizable strips to other thermoplastic materials in the manufacture of credit cards and the like. Strip 32 would not adhere to the thermoset polyester resin of transfer film 17; as applied to the thermoplastic polyester resin of cover film 18A or 18B, however, adherence is excellent. Furthermore, the relatively "soft" nature of the thermoplastic polyester resin constituting cover films 18A and 18B (actually they are moderately hard and tough) allows the magnetic strip 32 to sink into the cover film to a limited extent during the hot stamp transfer or like process, reducing any possibility that the magnetic strip may subsequently become detached from the completed document assembly 30.

Signature strip 33, in the embodiment illustrated in FIGS. 3 and 4, is a roughened strip formed by embossure of a portion of cover film 18A. This embossing operation may be accomplished as a part of the security pattern embossure. A strip of sandpaper or like material incorporated in the surface of embossing roll 26 (FIG. 2) affords an effective means for formation of signature strip 33. Of course, embossure of the signature strip could be carried out as a separate step independently of the formation of security pattern 31. Because the roughened signature strip 33 is formed in the outer surface of the thermoplastic polyester resin constituting cover film 18A, it is far more ink receptive than would be possible with a thermoset polyester resin such as that employed for transfer film 17.

The requirements for the laminating press used to seal the two cover members 13 and 14 of pouch 10 to document 11, as generally represented by the heated pressure rolls 23 and 24 in FIG. 2, are readily met with conventional equipment heretofore used for laminating films of thermoset polyester resin with polyethylene or like adhesive resin coatings on their interior surfaces. Thus, as previously noted, the platen temperature for the laminating press may be in a range of about 250° to 300° F. Lamination may be carried out by passing the pouch and document assembly through the platen rolls 23 and 24 at speeds in the range of about two to ten feet per minute. The same heat and rate ranges can be maintained for embossure, with pressures comparable to those applicable with an ordinary household iron.

Figure 5:
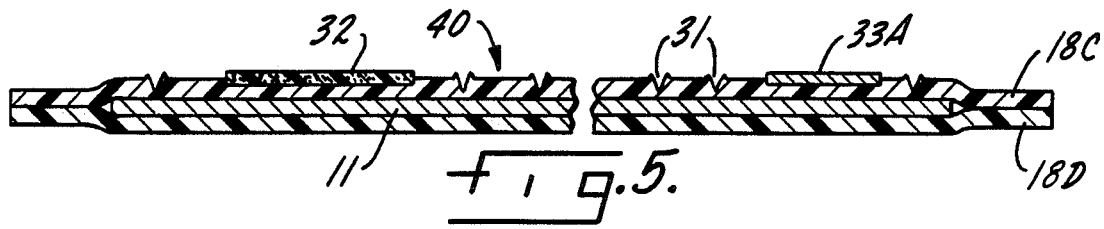
FIG. 5 is a detail sectional view, like FIG. 4, illustrating a modified embodiment of the invention.

FIG. 5 illustrates another embodiment of the invention that may be preferable in many applications and that affords a potentially significant cost reduction as compared with the construction shown in FIGS. 3 and 4. The starting lamination product for the card assembly 40 shown in FIG. 5 may be a pouch having a construction fully corresponding to that described and illustrated for pouch 10, FIG. 1, except that the inner adhesive film 19 of the pouch is eliminated. That is, only the cover film 18 and the transfer film 17 are utilized. As before, the laminating film product from which the pouch is formed preferably has the thermoplastic polyester cover film 18 formed in situ by extrusion onto the surface of the thermoset polyester resin transfer film 17, after coating of the transfer film surface with a soap or other suitable release agent. Lamination of the pouch to the identification card or other document is the same as described above in connection with FIG. 2, with transfer film 17 removed after lamination and before embossure or application of a magnetic strip, a signature strip, or any other form of data strip. In this instance, the thermoplastic properties of the cover film, films 18C and 18C in FIG. 5, are utilized to bond and seal the transparent cover to document 11. Stated differently, it is the thermoplastic polyester resin of cover film members 18C and 18D that serves as the adhesive resin in bonding to card 11.

As shown in FIG. 5, card assembly 40 may be provided with an external magnetizable data strip 32, applied in the same manner as discussed above in connection with FIGS. 3 and 4. Card assembly 40 also has another data strip, a signature strip 33A. In this instance the signature strip is a white pigment strip applied to the outer surface of cover film 18C by the hot stamp transfer process. Thus, strip 33A corresponds to the type of signature strip frequently used in credit cards formed of vinyl and other like materials.

The cover films 18 of embossable thermoplastic polyester resins that are used in the laminating film products of the present invention are not as hard as the thermoset polyester resins used in many conventional sealed covers for identification cards and like documents, nor are they as resistant to abrasion. Nevertheless, these cover films are quite adequate for the desired characteristics of toughness and abrasion resistance in many applications, particularly when the protected document is expected to have a limited useful life of a few months to perhaps two years. A number of different thermoplastic polyester resins have been found suitable for use in cover films 18. Typical examples are the Kodar A150 and Pet-G copolymer polyester resins available from Eastman Chemical Products, Inc. and the Petra type HS homopolymer polyester resin supplied by Allied Chemical Corporation. These resins, and others of the same general type, permit effective surface embossure for security purposes and for signature strips. Further, they provide effective acceptance and bonding of magnetic strips and pigment signature strips when applied to the cover films by inexpensive conventional techniques, particularly hot stamp transferring.

In the foregoing description, it has been assumed that the laminating film product is cut and folded into pouch form before use. However, suitable pouches can also be provided by cutting the individual cover members 13 and 14 (FIG. 1) as separate elements and sealing the two together along one edge to afford a pouch. Moreover, the laminating film product of the invention is equally suitable for use in continuous strip form or in large sheets, with individual document sections cut from the strip or sheet after lamination. Moreover, though roll lamination is described, the laminating films of the invention are equally well adapted to use in flat platen laminating presses and can also be embossed in flat bed presses. Precision control of the laminating and embossing temperatures is not required and conventional equipment can be utilized. It is also possible to emboss the cover film 18 during lamination or after lamination with the transfer film 17 still in place, and to remove the transfer film after embossure, but this is likely to entail unacceptable sacrifice in the clarity and definition of the embossures.

We claim:

1. The method of forming a transparent sealed protective cover on an identification card or other document comprising the following steps:
   A. applying a thin coating of a release agent to one surface of a transfer film of a very hard, tough thermoset resin;
   B. extruding a layer of a moderately hard and tough embossable unoriented thermoplastic polyester resin onto the coated surface of the transfer film, over the release coating, to form a laminating film product having a cover film of the thermoplastic polyester resin releasably bonded in surface-to-surface relation to the transfer film;
   C. aligning the laminating product with a document, with the cover film facing the document;
   D. applying heat and pressure to the aligned laminating product and document, in a laminating press, to bond the laminating product to the document; and
   E. peeling the transfer film away from the laminating product to expose the cover film.

2. The method of forming a transparent sealed protective cover on a document according to claim 1, comprising the following additional step:
   embossing the cover film with a predetermined pattern.

3. The method of forming a transparent sealed protective cover on a document according to claim 1, comprising the following additional step:
   bonding a data strip into the surface of the cover film.

4. The method of forming a transparent sealed protective cover on a document according to claim 3, comprising the following additional step:
   embossing the cover film with a predetermined pattern.

5. The method of forming a transparent sealed protective cover on a document according to claim 1 in which the thermoset resin used in step A is an oriented thermoset polyester resin.

6. The method of forming a transparent sealed protective cover on a document according to claim 5, comprising the following additional step:
   embossing the cover film with a predetermined pattern.

7. The method of forming a transparent sealed protective cover on a document according to claim 7, comprising the following additional step:
   bonding a data strip into the surface of the cover film.

8. The method of forming a transparent sealed protective cover on an identification card or other document comprising the following steps:
   A. applying a thin coating of a release agent to one surface of a transfer film of a very hard, tough thermoset resin;
   B1. extruding a layer of a moderately hard and tough embossable unoriented thermoplastic polyester resin onto the coated surface of the transfer film, over the release coating, to form a cover film releasably bonded in surface-to-surface relation to the transfer film;
   B2. extruding a film of a soft thermoplastic adhesive resin, activatable by heat and pressure, onto the exposed surface of the cover film to form a laminating film product;
   C. aligning the laminating product with a document, with the adhesive film facing the document;
   D. applying heat and pressure to the aligned laminating product and document, in a laminating press, to bond the laminating product to the document; and
   E. peeling the transfer film away from the laminating product to expose the cover film.

9. The method of forming a transparent sealed protective cover on a document according to claim 8, comprising the following additional step:
   embossing the cover film with a predetermined pattern.

10. The method of forming a transparent sealed protective cover on a document according to claim 8, comprising the following additional step:
    bonding a data strip into the surface of the cover film.

11. The method of forming a transparent sealed protective cover on a document according to claim 10, comprising the following additional step:
    embossing the cover film with a predetermined pattern.

* * * * *